US007080028B2

(12) United States Patent
Goodwin, III et al.

(10) Patent No.: US 7,080,028 B2
(45) Date of Patent: *Jul. 18, 2006

(54) METHODS AND APPARATUS FOR PROMOTIONAL ELECTRONIC SIGNS

(75) Inventors: John C. Goodwin, III, Suwanee, GA (US); Raghurama Bhyravabhotla, Suwanee, GA (US); Terry L. Zimmerman, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 624 days.

This patent is subject to a terminal disclaimer.

(21) Appl. No.: 09/847,795

(22) Filed: May 2, 2001

(65) Prior Publication Data

US 2002/0165779 A1  Nov. 7, 2002

(51) Int. Cl.
*G06Q 20/00* (2006.01)
(52) U.S. Cl. .......................................... 705/20; 705/416
(58) Field of Classification Search .................. 705/15, 705/16, 17, 18, 19, 20, 416, 26, 27
See application file for complete search history.

(56) References Cited

U.S. PATENT DOCUMENTS

| 1,844,692 | A | 2/1932 | Schnoor |
| 2,223,685 | A | 12/1940 | Herberger |
| 4,500,880 | A | 2/1985 | Gomersall et al. ..... 340/825.35 |
| 4,962,466 | A | 10/1990 | Revesz et al. .............. 364/518 |
| 5,111,196 | A | 5/1992 | Hunt ..................... 340/825.35 |
| 5,151,684 | A | 9/1992 | Johnsen ...................... 340/572 |
| 5,245,534 | A | 9/1993 | Waterhouse et al. ........ 364/404 |
| 5,482,139 | A | 1/1996 | Rivalto ......................... 186/36 |

(Continued)

FOREIGN PATENT DOCUMENTS

EP    1006434    6/2000

(Continued)

OTHER PUBLICATIONS

White, Ron, How Computers Work, Millennium Ed. Que Corporation, Sep. 1999.*

(Continued)

*Primary Examiner*—Andrew J. Fischer
(74) *Attorney, Agent, or Firm*—Priest & Goldstein, PLLC

(57) ABSTRACT

Techniques for displaying promotional information by providing an electronic sign (ES) which displays promotional information, display slogans, bundled pricing, bulk pricing, and other types of information. The ES can be used by retailers to increase sales, provide an alternate technique for advertising and reduce costs. According to one aspect, an EPL computer reads an EPL/ES data file to determine if an entry is associated with an EPL or an ES. The EPL computer then reads a promotional message from a promotional data file. An index in the EPL/ES data file may be used to determine the correct promotional message. The EPL computer transmits a message to the ES which includes a command for the ES to display the promotional message. The ES then displays the promotional message, providing valuable information to customers who are in the process of making purchasing decisions. In one aspect, an ES displays promotional information associated with an offer and is not associated with any particular single item. Such a special offer may apply to a family of items, rather than a particular single item. In another aspect, an ES is associated with an item and displays promotional information relating to that item. In another aspect, an ES is associated with an item and displays promotional information relating to another item or items.

18 Claims, 5 Drawing Sheets

U.S. PATENT DOCUMENTS

| | | | |
|---|---|---|---|
| 5,493,107 A | 2/1996 | Gupta et al. | 235/383 |
| 5,572,653 A | 11/1996 | DeTemple et al. | 395/501 |
| 5,719,781 A | 2/1998 | Leatherman et al. | 364/479.02 |
| 5,751,257 A | 5/1998 | Sutherland | 345/2 |
| 5,793,029 A | 8/1998 | Goodwin, III | 235/483 |
| 5,812,985 A | 9/1998 | Failing et al. | 235/383 |
| 5,854,474 A * | 12/1998 | Goodwin, III | 235/383 |
| 5,880,449 A | 3/1999 | Teicher et al. | |
| 5,975,416 A | 11/1999 | Chow et al. | 235/383 |
| 5,979,757 A | 11/1999 | Tracy et al. | 235/383 |
| 5,995,015 A | 11/1999 | DeTemple et al. | 340/825.49 |
| 6,016,481 A | 1/2000 | Failing, Jr. et al. | 705/28 |
| 6,021,395 A | 2/2000 | Goodwin, III | 705/20 |
| 6,047,263 A | 4/2000 | Goodwin, III | |

FOREIGN PATENT DOCUMENTS

GB    2344025    5/2000

OTHER PUBLICATIONS

Derfler, Frank J. et. al. How Networks Work, Millennium Ed., Que Corporation, Jan. 2000.*

Borland's Paradox for Windows User's Guide, Borland International, Inc, 1994.*

Riley, David D., Data Abstraction and Stucture, An Introduction to Computer Science II, Boyd and Fraser Publishing Company, 1987.*

* cited by examiner

METHODS AND APPARATUS FOR PROMOTIONAL ELECTRONIC SIGNS

FIELD OF THE INVENTION

The present invention relates generally to improvements in electronic price label (EPL) systems used in transaction establishments. More specifically, the present invention relates to improvements in EPL systems including systems and methods for an electronic sign to display promotional messages.

BACKGROUND OF THE INVENTION

EPL systems typically include a plurality of EPLs for each merchandise item in a store. EPLs display the price of corresponding merchandise items on store shelves and are typically attached to a rail along the leading edge of the shelves. A store may contain thousands of EPLs to display the prices of the merchandise items. The EPLs are coupled to a central server where information about the EPLs is typically maintained in an EPL data file which contains EPL identification information and EPL merchandise item information. Price information displayed by the EPLs is obtained from a price look-up (PLU) data file. The central server sends messages, including price change messages, to the EPLs.

EPL systems typically include EPLs which are assigned to specific items and display the price of the item and potentially promotional information relating only to the item. Prior art EPL systems do not allow retailers to utilize an EPL which displays promotional information relating to an item, groups of items or general sales events. Additionally, each of these prior art EPLs is assigned to a single item and do not allow a retailer to advertise prices, such as bundled prices, that involve two different items.

Previously, retail establishments have used paper signs or bibs to display promotional information. These paper signs must be installed manually, resulting in an increased setup time and costs.

Therefore, it would be desirable to provide an EPL system and method which includes an electronic sign that displays promotional messages.

SUMMARY OF THE INVENTION

The present invention advantageously provides methods and apparatus for displaying promotional information by providing an electronic sign (ES) which displays promotional information, display slogans, bundled pricing, bulk pricing, and other types of information. The ES can be used by retailers to increase sales, provide an alternate technique for advertising and reduce costs.

According to one aspect of the present invention, an EPL computer reads an EPL/ES data file to determine if an entry is associated with an EPL or an ES. The EPL computer then reads a promotional message from a promotional data file. An index in the EPL/ES data file may be used to determine the correct promotional message. The EPL computer transmits a message to the ES which includes a command for the ES to display the promotional message. The ES then displays the promotional message, providing valuable information to customers who are in the process of making purchasing decisions.

The present invention allows a retailer the flexibility to display advertising and promotional information without using EPLs which are dedicated to displaying prices for individual items. In one aspect, an ES displays promotional information associated with an offer and is not associated with any particular single item. Such a special offer may apply to a family of items, rather than a particular single item.

In another aspect, an ES is associated with an item and displays promotional information relating to that item. In another aspect, an ES is associated with an item and displays promotional information relating to another item or items.

A more complete understanding of the present invention, as well as further features and advantages of the invention, will be apparent from the following detailed description and the accompanying drawings.

DETAILED DESCRIPTION

The present invention now will be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Figure 1:
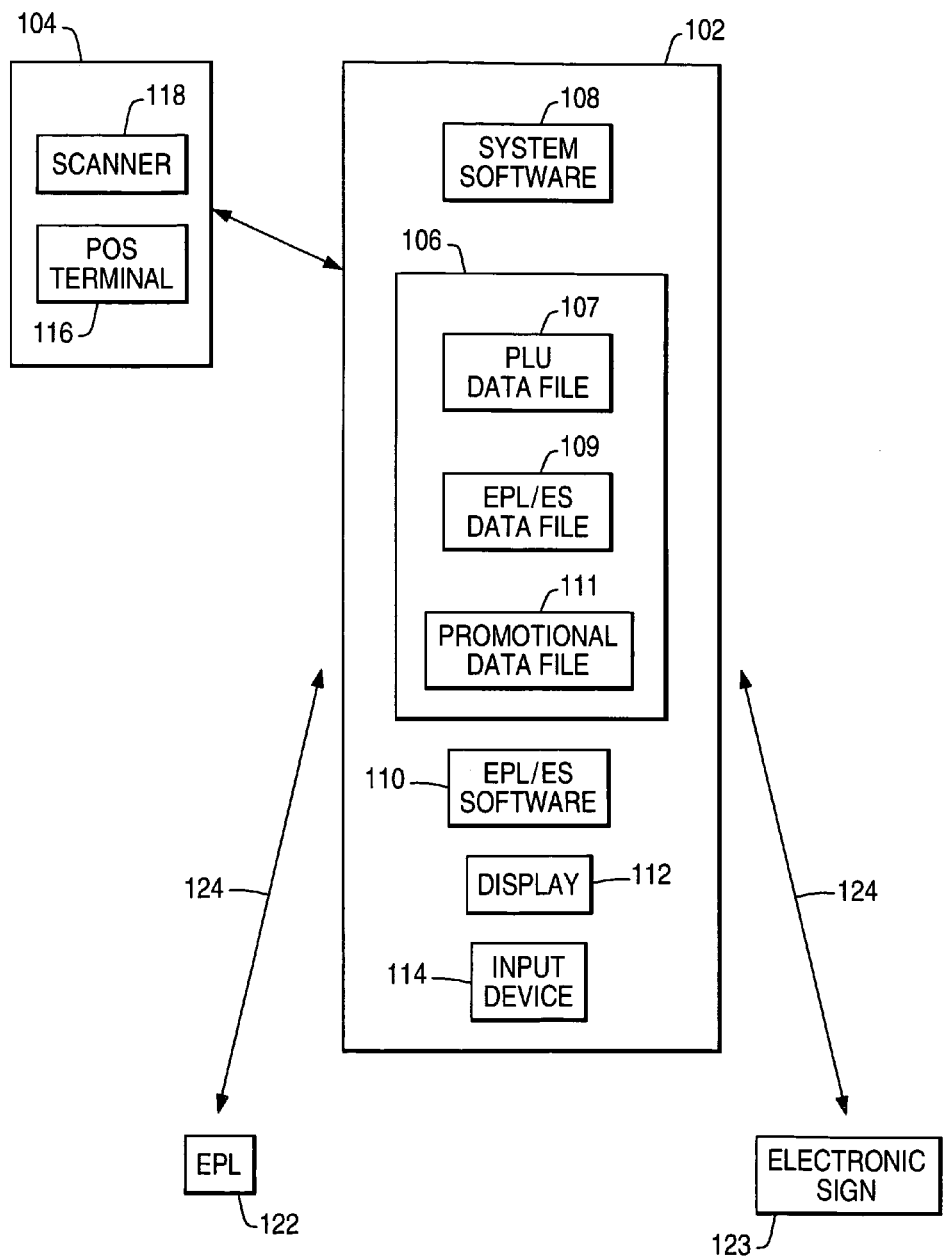
FIG. 1 is a block diagram of a transaction management system in accordance with the present invention.

FIG. 1 shows a transaction management system 100 in accordance with the present invention. The system 100 includes a host computer system 102 and a point-of-service (POS) system 104. Here, components 102 and 104 are shown as separate components that are networked together, but they and their subcomponents may also be combined or divided in various ways. Thus, host computer system 102 may be a POS terminal which doubles as a host computer for a network of other POS terminals.

The host computer system 102 includes a storage medium 106, system software 108, EPL/ES software 110, a display 112 and an input device 114. The storage medium 106 includes a PLU data file 107 which stores item prices which are available for distribution to a POS terminal 116 by the host system 102. Alternatively, provision may be made for a bar code scanner 118 to directly access the PLU data file 107. The storage medium 106 also includes EPL/ES data file 109 which contains information, such as a PLU number and identification information for each of the EPLs 122 and ESs 123. EPL/ES data file 109 also includes an item or promotion identification number which indicates if the associated identification number is for an EPL 122 or an ES 123. The system 102 executes system software 108 which updates the contents of storage medium 106 and performs other system functions. Input device 114 is preferably a keyboard, but it will be recognized that data can be entered in a variety of alternative manners.

POS system 104 includes bar code scanner 118 and POS terminal 116.

EPL/ES software 110 records, schedules, and transmits all messages to EPLs 122 and ESs 123 utilizing communications link 124. Communications link 124 may suitably utilize radio frequency (RF) communication, infrared (IR) communication, a wired link, or some combination of communication techniques. In an alternate embodiment, host system 102 may communicate with EPLs 122 utilizing relay units located throughout the retail establishment. After receiving a message, the EPLs 122 and ESs may respond with an acknowledgement.

As described above, the PLU data file 107 includes price information of items sold by the retail establishment. PLU data file 107 may be updated with new price or item information by entering the information with input device 114, transferring information from another data file, or other suitable techniques.

Figures 2, 4A:
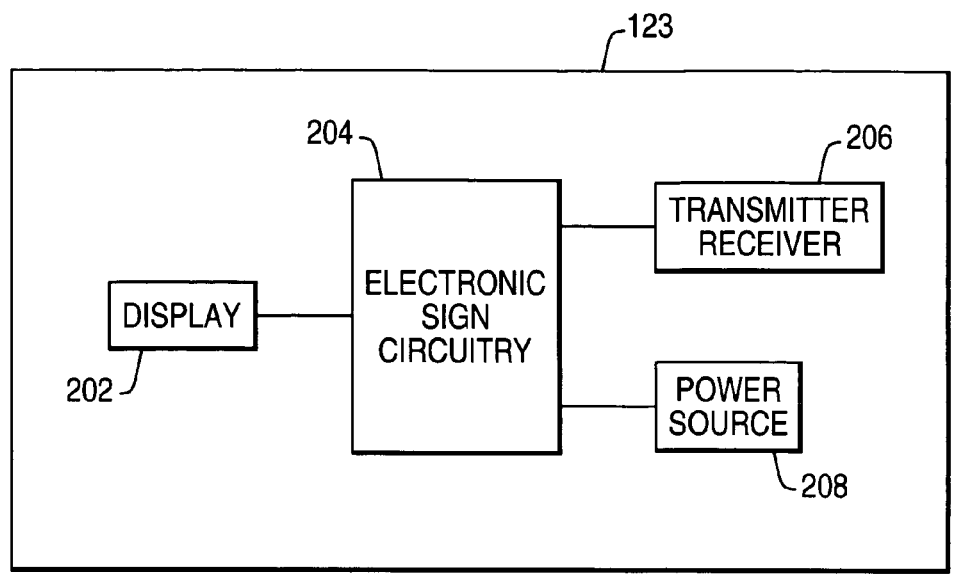
FIG. 2 is a block diagram of an ES in accordance with the present invention.
FIG. 4A is a frontal view of an ES displaying a first promotional message in accordance with one aspect of the present invention.

FIG. 2 shows a block diagram of the ES 123 in accordance with the present invention. A display 202 displays promotional information. ES 123 includes a transmitter/receiver 206 for transmitting messages and receiving messages. The transmitter/receiver may utilize RF communication, IR communication, a wired link or some combination of communication techniques. A power source 208 provides power for the operation of ES 123. Power may be provided by a battery, solar cell, an external source, or other suitable techniques. The operation of ES 123 is controlled by ES circuitry 204. ES circuitry 204 decodes incoming messages received, and performs any actions indicated by the messages. For example, when a promotional display message is received, the ES circuitry 204 would cause the display 202 to be updated with the promotional information included in the message. ES circuitry 204 may also include a variety of components, such as memory, timers and other components.

The display 202 may be larger than the displays of prior art EPLs 122, allowing more information to be displayed to customers.

Figure 3:
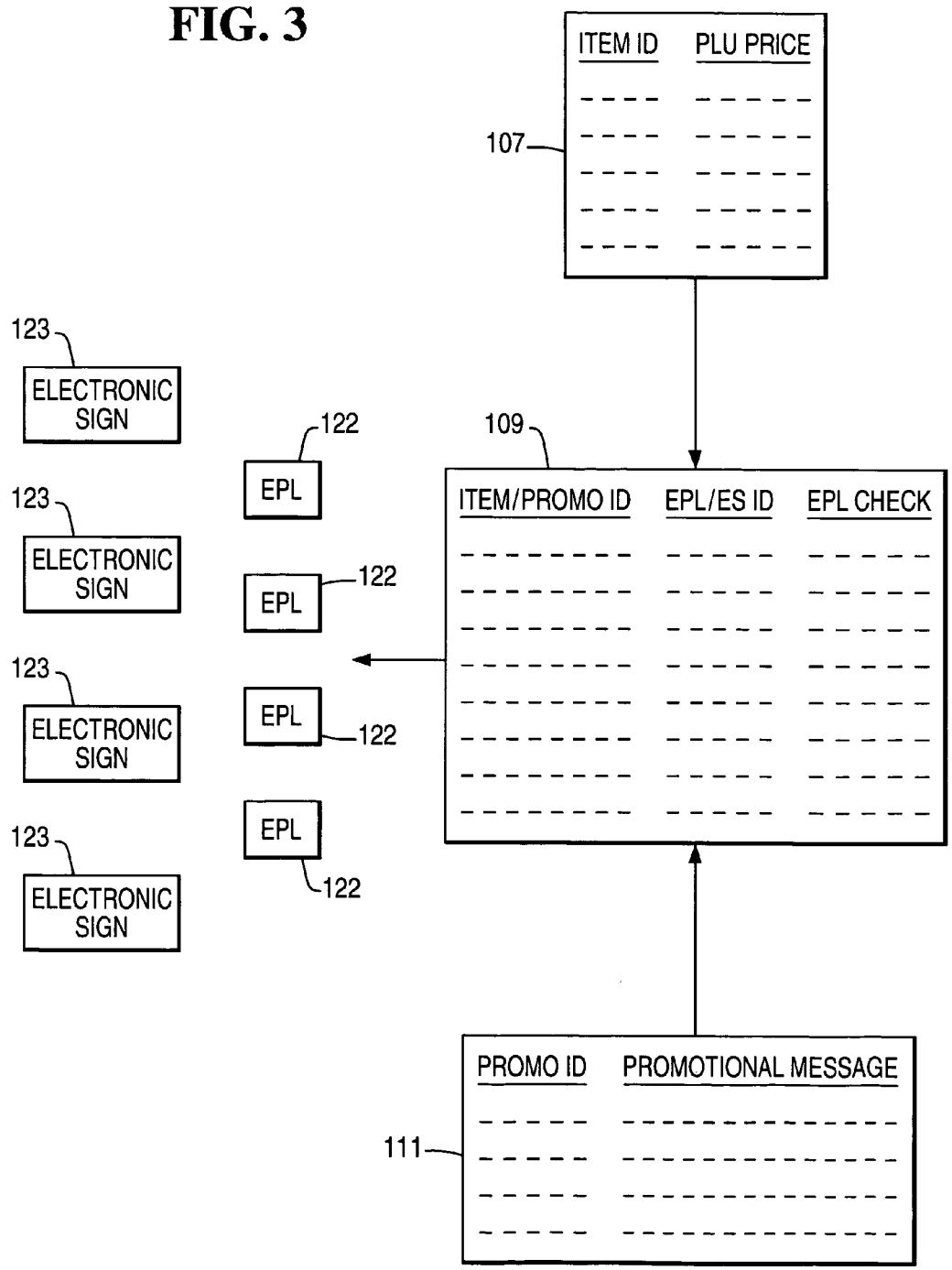
FIG. 3 is a block diagram of data files of the transaction management system in accordance with the present invention.

Turning now to FIG. 3, EPL/ES data file 109, PLU data file 107 and promotional data file 111 are shown in more detail. EPL/ES data file 109 includes a line entry for each EPL 122 and each ES 123 in EPL system 100. Each line entry may include an item or promotion identification entry (ITEM/PROMO ID), an EPL or ES identification entry (EPL/ES ID) and a price checksum (EPL CHECK) entry. Entry ITEM/PROMO ID identifies either a store item or a promotional message, and includes a flag which indicates if the entry is associated with an EPL 122 or an ES 123. Entry EPL/ES ID identifies which EPL is assigned to the item, or which ES is assigned to the promotional message. Entry price checksum (EPL CHECK) is calculated from the price in PLU data file 44. In a preferred embodiment, ITEM/PROMO ID may include an offset pointer indicating a particular promotional message included in promotional data file 111 or a particular item in PLU file 107. Promotional data file 111 includes promotional messages and a promotional identification numbers (PROMO ID) which identify the promotional messages.

PLU data file 107 includes a line entry for each item sold in the store. Each line entry has an item identification entry (ITEM ID) identifying a store item, and a PLU price entry (PLU PRICE) identifying the price read by POS system 104 to determine the price of each item during scanning by bar code scanner 118.

The present invention advantageously allows retailers to utilize an ES 123 to display a promotional message without the ES 123 being associated with an ITEM ID in the PLU file 107. In contrast to prior art EPL systems which include only EPLs which are associated with an item and must be located adjacent to the item in order to display the price of the item, and possibly a promotional message which is associated with the item, the present invention allows the ES 123 to display a promotional message without having to be associated with an item and displaying an item price. Instead of being associated with an item identification and a price in the PLU file 107, the ES 123 is associated with a promotional message in promotional data file 111. While the ES 123 may display promotional data about a specific item, the ES 123 is not associated with any item's identification number in the PLU data file 107.

In an alternate embodiment, the promotional message may be associated with an alias PLU entry in which a PLU number is created which corresponds to a bundled offer comprising a plurality of items. Each of the plurality of items has an associated PLU number and the bundle of all the items purchased together has an associated alias PLU number. A promotional message is then associated with alias PLU number.

FIG. 4A shows an ES 123 displaying a first promotional message 60 in accordance with the present invention. The ES 123 may suitably display the message "TRY ACME PRETZELS". Such a message may be advantageously used if, for example, the ES 123 is located near the beer section and the retailer is promoting ACME pretzels as a suitable accompaniment to beer.

Figure 4B:
FIG. 4B is a frontal view of an ES displaying a second promotional message in accordance with another aspect of the present invention.

Additionally, a promotional message may be associated with an offer that applies not to a single item, but to a family of items which are not associated with a single PLU number. FIG. 4B shows an ES 123 displaying the promotional message "ALL ORANGE JUICE 20% OFF". Such a message may be used if the ES 123 is located near the cold medicine section and the retailer is promoting an orange juice offer to help with colds.

Figure 4C:
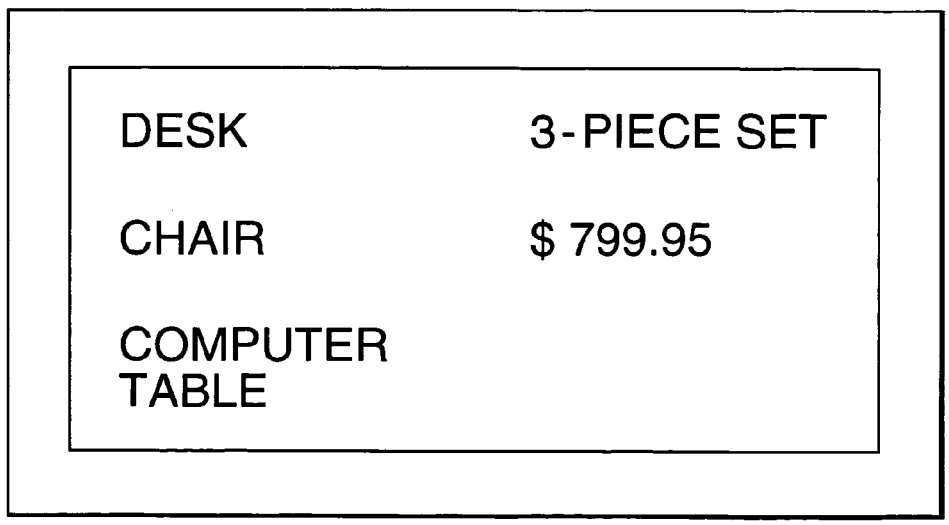
FIG. 4C is a frontal view of an ES displaying a third promotional message in accordance with another aspect of the present invention.

In one aspect, as shown in FIG. 4C, the promotional message may include bundled price information associated with an offer. For example, a store may have a first EPL associated with the PLU number for a chair, a second EPL associated with the PLU number for a desk and a third EPL associated with the PLU number for a computer table. While individual prices are associated with each item, the store may have a bundled price for the purchase of the desk, chair and table together. Such bundled pricing is associated with an offer, rather than a single item. To provide advertising for the offer, the store may position an ES near the desk, table and chair to provide customers with the price information relating to the offer.

As another example, a store may be promoting a special offer, such as, if the consumer purchases hot dogs, hot dog buns and mustard, then the relish is free. Such a pricing scheme is not included in the PLU file, but is controlled by separate offer software. A prior art EPL assigned to any of these items would receive pricing information from the PLU. The ES assigned to this promotion receives display information from the promotional data file which includes a promotional message relating to this offer.

In another aspect, an ES 123 in accordance with the present invention may display a default message when the ES 123 is not displaying a promotional message. In such a case, the EPL computer sends a promotional display message to the ES 123 which includes a promotional message to be displayed and a time period for which the message is to be displayed. After receiving the message, the ES 123 displays the promotional message for the period indicated and then displays a default message, such as "Thank you for shopping with us!"

In another aspect, an ES 123 in accordance with the present invention may display a frequent buyer price for an item.

Figure 5:
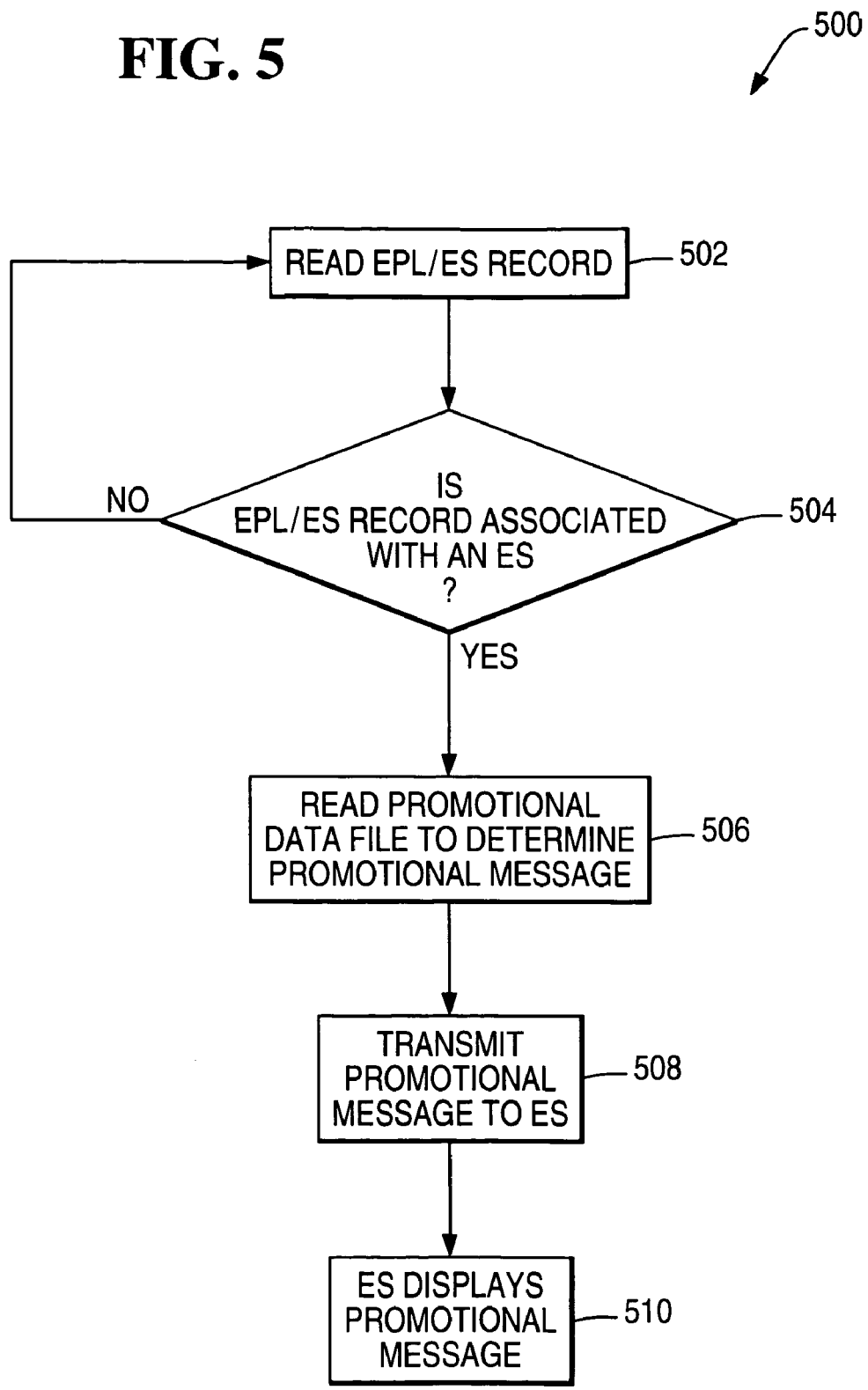
FIG. 5 shows a method of displaying a promotional message by an ES in accordance with the present invention.

FIG. 5 shows a method 500 of displaying a promotional message by an ES, such as ES 123, in accordance with the present invention. In step 502, an EPL/ES software program reads an EPL/ES record associated with an EPL or an ES in an EPL/ES data file, such as EPL/ES data file 109. In step 504, the EPL/ES software program determines if an ITEM/PROMO ID entry in the EPL/ES record indicates that an EPL or an ES is associated with the ITEM/PROMO ID entry. In a preferred embodiment, the ITEM/PROMO ID entry includes a flag which provides this indication. If the ITEM/PROMO ID indicates that the entry is associated with an EPL, the method continues at step 502 with the processing of the next record. If the ITEM/PROMO ID indicates that the entry is associated with an ES which is used for promotional messages and, thus, is not associated with an item number in the PLU file 107, the method continues at step 506. In step 506, the EPL/ES software program reads a promotional data file to determine the promotional message to be displayed by the ES 123 associated with the record entry. In a preferred embodiment, the ITEM/PROMO ID provides an index pointer indicating the correct promotional message. Next, in step 508, the EPL/ES software program sends a promotional display message to the ES. In step 510, the ES displays the message.

It will be apparent to those skilled in the art that various modifications and variations can be made in the present invention without departing from the spirit and scope of the present invention. Thus, it is intended that the present invention cover the modifications and variations of this invention provided they come within the scope of the appended claims and their equivalents.

We claim:

1. A combined electronic price label (EPL) and electronic sign (ES) system comprising:
    a plurality of electronic signs (ESs) for displaying promotional messages associated with promotion identification numbers;
    a plurality of EPLs;
    a promotional data file;
    a price lookup (PLU) file; and
    a host computer reading a combined EPL/ES data file separate from the PLU file and having a field for storing both promotion identification numbers and an item identification numbers, the host computer determining whether a particular identification number stored in said field of the EPL/ES data file is a promotion identification number associated with an ES or an item identification number associated with an EPL, and, when the promotion identification number is associated with an ES, said host computer reading the promotional message corresponding to the promotion identification number from the promotional data file and sending a promotional display message to the ES which includes a command for the ES to display the promotional message.

2. The combined EPL and ES system of claim 1 further wherein the promotional data file further includes a plurality of promotional messages, and wherein the host computer utilizes the identification number to provide an index to select one of the plurality of promotional messages from the promotional data file for transmission to the ES.

3. The combined EPL and ES system of claim 1 wherein the message to the EPL includes a command for the EPL to display a price if the identification number is associated with the EPL.

4. The combined EPL and ESL system of claim 1 wherein the identification number:
    provides a message offset pointer indicating a location of the promotional message, if the identification number is associated with the ES, and
    provides a price offset pointer indicating a location of a price displayed by the EPL, if the identification number is associated with the EPL.

5. The combined EPL and ES system of claim 1 wherein the promotional message is associated with an offer.

6. The combined EPL and ES system of claim 5 wherein the offer applies to a family of items which are not associated with a single PLU number.

7. The combined EPL and ES system of claim 1 wherein the promotional message includes bundled price information associated with an offer.

8. The combined EPL and ES system of claim 1 wherein the ES displays a default message when the ES is not displaying the promotional message.

9. The combined EPL and ES system of claim 1 wherein the message sent to the ES includes a time period for which the promotional message is to be displayed.

10. The combined EPL and ES system of claim 1 wherein the ES displays a default message after the time period has expired.

11. The combined EPL and ES system of claim 10 wherein the ES displays the default message before the message is received.

12. The combined EPL and ES system of claim 1 wherein the promotional message includes a frequent buyer price.

13. A method of displaying a promotional message by a combined electronic price label (EPL) and electronic sign (ES) system comprising the steps of:
    (a) reading a record associated with an EPL or an ES from a combined EPL/ES data file separate from a price lookup (PLU) file, the record having a field for storing both a promotion identification number and an item identification number;
    (b) determining whether a particular identification number stored in said field of the combined EPL/ES data file is a promotion identification number associated with an ES or an item identification number associated with an EPL;
    (c) reading a promotional data file to determine the promotional message, when the record is associated with the ES;
    (d) sending a promotional display message to the ES; and
    (e) displaying the promotional message by the ES.

14. The method of claim 13 wherein step (b) utilizes a flag which indicates if the record is associated with an EPL or an ES.

15. The method of claim 13 further comprising, before step (a), the step of:
    displaying a default promotional message by the ES.

16. The method of claim 13 wherein the promotional display message includes a time period for which the promotional message is to be displayed.

17. The method of claim 16 further comprising the step of:
(f) displaying a default promotional message after the time period has elapsed.

18. The combined EPL and ES system of claim 1 wherein if the identification number is associated with the EPL, then the host computer looks up a price for the EPL in the PLU and sends a message to the EPL.

* * * * *